United States Patent
Tries et al.

(10) Patent No.: US 8,328,503 B2
(45) Date of Patent: Dec. 11, 2012

(54) CHARGING EQUIPMENT

(75) Inventors: Timo Tries, Schwieberdingen (DE); Gunter Winkler, Stuttgart (DE); Matthias Stein, Korntal-Muenchingen (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 467 days.

(21) Appl. No.: 12/604,537

(22) Filed: Oct. 23, 2009

(65) Prior Publication Data

US 2010/0104425 A1   Apr. 29, 2010

(30) Foreign Application Priority Data

Oct. 24, 2008   (DE) .......................... 10 2008 053 169

(51) Int. Cl.
*F01D 17/16*   (2006.01)
(52) U.S. Cl. ........................................ 415/160; 415/163
(58) Field of Classification Search .......... 415/159–166; 60/602
See application file for complete search history.

(56) References Cited

U.S. PATENT DOCUMENTS

| | | |
|---|---|---|
| 4,643,640 A | 2/1987 | Burdette et al. |
| 4,654,941 A * | 4/1987 | Burdette et al. ............. 415/164 |
| 6,742,986 B2 | 6/2004 | Osako et al. |
| 7,303,370 B2 | 12/2007 | Metz et al. |
| 2010/0154415 A1 * | 6/2010 | Ehrhard ....................... 60/605.1 |

FOREIGN PATENT DOCUMENTS

| | | |
|---|---|---|
| DE | 10 2007 029 004 A1 * | 12/2008 |
| EP | 0332354 A1 | 9/1989 |
| EP | 1099838 A1 | 5/2001 |
| JP | 2000204907 A | 7/2000 |
| WO | WO-2006/038836 A1 | 4/2006 |
| WO | WO-2009/000436 | 12/2008 |

OTHER PUBLICATIONS

English abstract for JP-2000204907, dated Jul. 25, 2000.
English abstract for EP-1099838, dated May 16, 2001.

* cited by examiner

*Primary Examiner* — Christopher Verdier
(74) *Attorney, Agent, or Firm* — Rader, Fishman & Grauer PLLC

(57) ABSTRACT

Charging equipment is disclosed, comprising a variable turbine geometry, and a plurality of guide vanes rotatably mounted between at least one of a guide vane carrier, a cover disc and a turbine housing. The guide vane carrier is positioned on at least one of the cover disc and on the turbine housing by at least one spacer. The geometry has at least two different types of flow channels, a first flow channel wherein flow is influenced by the spacer, and a second flow channel wherein flow is not influenced by the spacer. The first flow channel guide vanes have a radial distance ($R_1$) to a turbine wheel axis, and to a distance from an adjacent guide vane are configured and adjusted such that a gas flow from the first flow channel meeting the turbine wheel corresponds to a gas flow from the second flow channel meeting the turbine wheel.

18 Claims, 1 Drawing Sheet

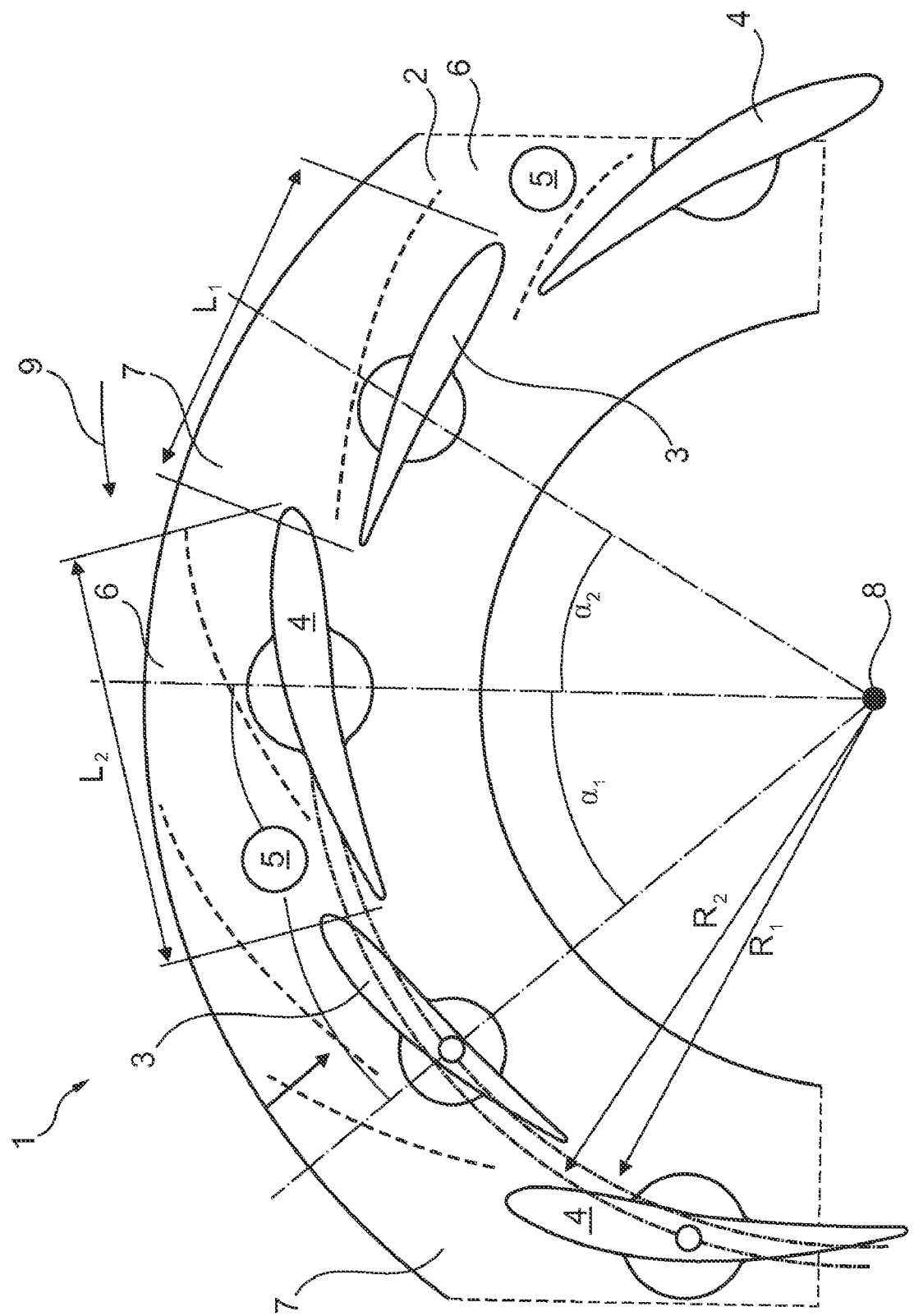

CHARGING EQUIPMENT

CROSS-REFERENCES TO RELATED APPLICATION

This application claims priority to German patent application DE 10 2008 053 169.3 filed on Oct. 24, 2008, which is hereby incorporated by reference in its entirety.

The present invention relates to charging equipment, in particular an exhaust-gas turbocharger for a motor vehicle.

In modern motor vehicles, exhaust-gas turbochargers having so-called variable turbine geometries are increasingly used in which the power output and the responsiveness can be adjusted. The variable turbine geometries have, for the most part, rotatable guide vanes, wherein a respective flow channel is bordered by two walls, namely by a guide vane carrier and a covered disc connected thereto by means of spacers. During operation of the charging equipment, precisely these spacers generate, however, a flow diversion, thereby effecting a pressure field that brings about torque in the axes of the guide vanes. In this manner, forces in the variable turbine geometry result in certain positions of the guide vanes, which forces can bring about poor controllability and a high degree of wear. Moreover, the spacers effect different inflow conditions on a turbo wheel in such a manner that said turbo wheel is not uniformly, and thus not optimally, flowed against.

Document U.S. Pat. No. 6,742,986 B2 discloses charging equipment of the generic kind in which the spacers are preferably arranged on those locations on which they effect as little an influence as possible on the inflow behaviour on a turbo wheel.

Document EP 0 332 354 A1 discloses yet another piece of charging equipment having a variable turbine geometry, which has two types of differently shaped guide vanes that can furthermore be controlled independently from one another.

The present invention addresses the problem of providing for charging equipment of the generic kind an improved embodiment that, in particular, exhibits a high degree of efficiency.

This problem is solved according to the subject matter of the present disclosure. Advantageous embodiments are the subject matter of the following disclosure.

The invention is based on the general concept of generating a homogenized flow of gas on a turbo wheel in a charging equipment, in particular in an exhaust-gas turbocharger in a motor vehicle, to become an increased degree of efficiency. The charging equipment according to the invention has for this purpose a variable turbine geometry with guide vanes mounted between a guide vane carrier and at least one of a cover disc and a turbine housing, These spacers effect in the variable turbine geometry primarily two different types of flow channels, namely a first flow channel in which a flow behavior is influenced by a corresponding spacer, and a second flow channel in which a flow behavior remains uninfluenced by such a spacer. The guide vanes respectively arranged in the region of the first flow channel are configured or adjusted with regard to their shape, their radial distance to a turbine wheel axis and/or with regard to their distance to an adjacent guide vane, which is located in a second flow channel in such a manner that a respective gas flow that is from the first flow channel and that contacts the turbine wheel is adjusted to the respective gas glow that is from the adjacent second flow channel and that furthermore contacts the turbine wheel. The guide vanes used in the first flow channel are accordingly configured with regard to their shape and their arrangement in such a manner that influences on a gas flow caused by the spacers are compensated in such a manner that the gas flow that comes into contact with the turbine wheel and that is from the first flow channel corresponds at least approximately to the gas flow that is from the respective second flow channel, thereby leading to the turbine wheel being uniformly flowed against from preferably all flow channels. The turbine wheel being uniformly flowed against generates a particularly high degree of efficiency of the charging equipment and, at the same time, prevents a negative influence of the different gas flows. At the same time, with such an adjusted, variable turbine geometry, the stresses of the individual guide vanes are reduce, by means of which their service life and thus also the service life of the variable turbine geometry can be increased altogether.

In an advantageous development of the solution according to the invention, the guide vanes, which are arranged in the region of the first flow channel, respectively have a smaller or larger distance to a turbine wheel axis and the respective guide vanes in the second flow channel. The flow behaviour that is influenced by a spacer arranged respectively in the first flow channel is hereby intended to be compensated, that is to say equalised, wherein in this case, attention must of course be paid to the fact that an adjustment mechanism for adjusting the guide vanes, for example an adjustment ring or a lever with a corresponding actuation lever, is aligned with the respective different arrangement of the guide vanes. Such a different arrangement generally effects the equalisation of the gas flows that reach the turbine wheel and flow out of the first and second flow channels, and thus moreover represents a possible adjustment type of the variable turbine geometry in order to be able to generate a uniform gas flow that also increases the degree of efficiency of the charging equipment.

Additional important features and advantages of the invention can be found in the dependent claims, in the drawing, and in the pertinent description of the figures with reference to the drawing.

It is understood that the features described above and those to be described in what follows can be used not only in particular cited combination, but also in other combinations or independently without departing from the scope of the present invention.

A preferred exemplary embodiment of the invention is represented in the drawing and is described in greater detail in the following.

The sole FIG. 1 shows a section of a variable turbine geometry according to the invention.

According to FIG. 1, a variable turbine geometry 1 has a guide vane carrier 2 on which different guide vanes 3 and 4 are rotatably mounted. The guide vane carrier 2 represents a wall of a flow channel that is delimited respectively by two guide vanes 3 and 4, which are arranged adjacent to one another, and is furthermore delimited by a cover disc/basket/turbine housing that is not shown and runs parallel to the guide vane carrier 2. A fixing/positioning of the cover disc on the guide vane carrier 2 can be effected by means of a plurality of, at least, however, by means of two to three spacers 5. They can, for example, be configured as spacer pins. The spacers 5 generate in principle two different types of flow channels 6 and 7, namely a first flow channel 6, in which a flow behaviour is influenced by an associated spacer 5, and furthermore a second flow channel 7 the flow behaviour of which is not influenced by such a spacer 5.

In order to maintain as uniform a flow of a turbine wheel as possible, the guide vanes 3, which are respectively arranged in the region of the first flow channel 6, are, with regard to their shape, their radial distance R from a turbine wheel axis, and/or with regard to their distance from an adjacent guide vane 4, adjusted to the flow behaviours influenced by the spacer 5 respectively in the first flow channel 6. The guide vanes 3, which differ from the guide vanes 4, bring about the situation that a gas flow that respectively meets the turbine wheel that is also from the first flow channel 6 is at least matched to, preferably even corresponds to, the respective gas flow that meets the turbine wheel that is also from the second flow channel 7. In this manner, a particularly uniform approaching flow of the turbine wheel can be generated, from which a high degree of efficiency on the charging equipment according to the invention results.

A different form of the two guide vanes 3 and 4 can, for example, consist in a different guide vane length L, wherein it can be seen according to the representation in FIG. 1 that a guide vane length $L_1$ of the guide vane 3 is less than a guide vane length $L_2$ of the guide vane 4. It can alternatively or cumulatively be provided that the guide vanes 3, which are respectively arranged in the region of the first flow channel 6, have a smaller distance $R_1$ from the turbine wheel axis 8 than the respective guide vanes 4 in the second flow channel 7, or the converse. Furthermore, the guide vanes 3, which are respectively arranged in the region of the first flow channel 6, have a surface curvature which is less than the respective guide vanes 4 in the second flow channel 7, or the converse.

Additionally or alternatively, the guide vanes 3, which are respectively arranged in the region of the first flow channel 6, have a greater circumferential distance to a guide vane 4 positioned upstream in an adjacent second flow channel 7, than to a guide vane 4 positioned downstream in a second flow channel 7, or the converse. A general direction of flow is characterised with reference number 9. Such a different circumferential distance can, for example, be expressed in different angles a so that an angle al' which characterises a circumferential distance of a guide vane 3 that is arranged in the first flow channel 6 to a guide vane 4 that is positioned upstream in an adjacent second flow channel 7, is larger or smaller than the angle a 2, which characterises a circumferential distance of the guide vane 3 to a guide vane 4 positioned downstream in a second flow channel 7.

Independent from the guide vane 3, the spacers 5 can, with regard to their shape, be adjusted in such a manner that they influence as little as possible a flow behaviour in the first flow channel 6. Such an adjustment can, for example, bring about that at least one of the spacers 5 is configured as round, profiled, and/or tapered.

Additional adjustments in the shape of the guide vanes 3 can, for example consist in at least one of a skeleton line, a thickness, and a length-to-thickness ratio, that is different from that of guide vane 4. Generally, it is necessary that the individual measures can be used both alternatively as well as cumulatively in order to preserve a flowing against the turbine wheel that is as uniform as possible, thereby likewise maintaining an increased degree of efficiency.

With the variable turbine geometry 1 according to the invention, an individual stress, in particular a bending moment in the respective guide vane pins associated with the respective guide vanes 3, 4, can be positively influenced, by means of which the service life of the variable turbine geometry 1 can be increased overall. By means of the compensated or reduced stress, an improved functionality of the variable turbine geometry 1 can also be achieved in critical situations. It is clear that for an efficient functioning of the variable turbine geometry 1, an associated adjustment ring, which is not shown, must, for example, be adjusted to the different radii $R_{1,2}$ just as, for example, the different lever arms must be adjusted to the guide vanes 3, 4. The variable turbine geometry 1 can thus be used not only for Otto engines but also for diesel engines, and furthermore effects a better diversion and a decreased resistance of the gas flow.

REFERENCE NUMBER LIST

1 Variable turbine geometry
2 Guide vane carrier
3 Guide vane in the first flow channel 6
4 Guide vane in the second flow channel 7
5 Spacer
6 First flow channel
7 Second flow channel
8 Turbine wheel axis
9 Flow direction

The invention claimed is:

1. A piece of charging equipment, comprising:
a variable turbine geometry, and
a plurality of guide vanes rotatably mounted between a guide vane carrier and at least one of a cover disc and a turbine housing, wherein the guide vane carrier is positioned on at least one of the cover disc and on the turbine housing by at least one spacer, wherein the variable turbine geometry has at least two different types of flow channels, a first flow channel wherein flow is influenced by the spacer, and a second flow channel wherein flow is not influenced by the spacer, wherein the guide vanes in the first flow channel are shaped to have a radial distance ($R_1$) to a turbine wheel axis, and to a distance from an adjacent guide vane are configured and adjusted such that a gas flow from the first flow channel meeting the turbine wheel corresponds to a gas flow from the second flow channel meeting the turbine wheel, and wherein the guide vanes in the first flow channel have a different distance ($R_1$) to the turbine wheel axis than the guide vanes in the second flow channel.

2. The charging equipment as specified in claim 1, wherein the guide vanes in the first flow channel have a different guide vane length ($L_1$) than the guide vanes in the second flow channel.

3. The charging equipment as specified in claim 2, wherein the guide vanes in the first flow channel exhibit a different surface curvature than the guide vanes in the second flow channel.

4. The charging equipment as specified in claim 2, wherein the guide vanes in the first flow channel exhibit a different circumferential distance to the guide vane positioned upstream in the adjacent second flow channel than the guide vane positioned downstream in the second flow channel.

5. The charging equipment as specified in claim 2, wherein the guide vanes in the first flow channel differ from the guide vanes in the second flow channel with regard to at least one of a skeleton line, a thickness, and a length-to-thickness ratio.

6. The charging equipment as specified in claim 1, wherein the at least one spacer is at least one of round, and profiled.

7. The charging equipment as specified in claim 1, wherein the guide vanes in the first flow channel exhibit a different surface curvature than the respective guide vanes in the second flow channel.

8. The charging equipment as specified in claim 1, wherein the guide vanes in the first flow channel exhibit a different circumferential distance to the guide vane positioned upstream in the adjacent second flow channel than the guide vane positioned downstream in the second flow channel.

9. The charging equipment as specified in claim 1, wherein the guide vanes in the first flow channel differ from the guide vanes in the second flow channel with regard to at least one of a skeleton line, a thickness, and a length-to-thickness ratio.

10. A piece of charging equipment, comprising:
a variable turbine geometry, and
a plurality of guide vanes rotatable mounted between a guide vane carrier and at least one of a cover disc and a turbine housing, wherein the guide vane carrier is positioned on at least one of the cover disc and on the turbine housing by at least one spacer, wherein the variable turbine geometry has at least two different types of flow channels, a first flow channel wherein flow is influenced by the spacer, and a second flow channel wherein flow is not influenced by the spacer, wherein the guide vanes in the first flow channel are shaped to have a radial distance ($R_1$) to a turbine wheel axis, and to a distance from an adjacent guide vane are configured and adjusted such that a gas flow from the first flow channel meeting the turbine wheel corresponds to a gas flow from the second flow channel meeting the turbine wheel, wherein the guide vanes in the first flow channel exhibit a different surface curvature than the guide vanes in the second flow channel.

11. The charging equipment as specified in claim 10, wherein the guide vanes in the first flow channel exhibit a different circumferential distance to the guide vane positioned upstream in the adjacent second flow channel than the guide vane positioned downstream in the second flow channel.

12. The charging equipment as specified in claim 10, wherein the guide vanes in the first flow channel differ from the guide vanes in the second flow channel with regard to at least one of a skeleton line, a thickness, and a length-to-thickness ratio.

13. The charging equipment as specified in claim 10, wherein the guide vanes in the first flow channel have a different guide vane length ($L_1$) than the guide vanes in the second flow channel.

14. A piece of charging equipment, comprising:
a variable turbine geometry, and
a plurality of guide vanes rotatable mounted between a guide vane carrier and at least one of a cover disc and a turbine housing, wherein the guide vane carrier is positioned on at least one of the cover disc and on the turbine housing by at least one spacer, wherein the variable turbine geometry has at least two different types of flow channels, a first flow channel wherein flow is influenced by the spacer, and a second flow channel wherein flow is not influenced by the spacer, wherein the guide vanes in the first flow channel are shaped to have a radial distance ($R_1$) to a turbine wheel axis, and to a distance from an adjacent guide vane are configured and adjusted such that a gas flow from the first flow channel meeting the turbine wheel corresponds to a gas flow from the second flow channel meeting the turbine wheel, wherein the guide vanes in the first flow channel exhibit a different circumferential distance to the guide vane positioned upstream in the adjacent second flow channel than the guide vane positioned downstream in the second flow channel.

15. The charging equipment as specified in claim 14, wherein the guide vanes in the first flow channel differ from the guide vanes in the second flow channel with regard to at least one of a skeleton line, a thickness, and a length-to-thickness ratio.

16. The charging equipment as specified in claim 14, wherein the guide vanes in the first flow channel have a different guide vane length ($L_1$) than the guide vanes in the second flow channel.

17. A piece of charging equipment, comprising:
a variable turbine geometry, and
a plurality of guide vanes rotatably mounted between a guide vane carrier and at least one of a cover disc and a turbine housing, wherein the guide vane carrier is positioned on at least one of the cover disc and on the turbine housing by at least one spacer, wherein the variable turbine geometry has at least two different types of flow channels, a first flow channel wherein flow is influenced by the spacer, and a second flow channel wherein flow is not influenced by the spacer, wherein the guide vanes in the first flow channel are shaped to have a radial distance ($R_1$) to a turbine wheel axis, and to a distance from an adjacent guide vane are configured and adjusted such that a gas flow from the first flow channel meeting the turbine wheel corresponds to a gas flow from the second flow channel meeting the turbine wheel, wherein the guide vanes in the first flow channel differ from the guide vanes in the second flow channel with regard to at least one of a skeleton line, a thickness, and a length-to-thickness ratio.

18. The charging equipment as specified in claim 17, wherein the guide vanes in the first flow channel have a different guide vane length ($L_1$) than the guide vanes in the second flow channel.

\* \* \* \* \*